United States Patent [19]

Okamura et al.

[11] Patent Number: 4,546,936
[45] Date of Patent: Oct. 15, 1985

[54] MAGNETIC TAPE CASSETTE CASING

[75] Inventors: Masatoshi Okamura; Toshihiko Ishida, both of Tokyo, Japan

[73] Assignee: TDK Corporation, Tokyo, Japan

[21] Appl. No.: 589,315

[22] Filed: Mar. 14, 1984

[30] Foreign Application Priority Data

Mar. 29, 1983 [JP] Japan .................. 58-44292[U]

[51] Int. Cl.$^4$ .................. G03B 1/04; G11B 15/32
[52] U.S. Cl. .................. 242/198; 242/199
[58] Field of Search .............. 242/192, 194, 197–200; 352/72–78 R; 360/96.1, 96.5, 132

[56] References Cited

U.S. PATENT DOCUMENTS 3,140,832 7/1964 Cech .................. 242/199
3,758,730 9/1973 Rothschild et al. ............ 360/132 X Primary Examiner—Leonard D. Christian
Attorney, Agent, or Firm—Oblon, Fisher, Spivak, McClelland & Maier

[57] ABSTRACT

A magnetic tape cassette comprises upper and lower casings to be assembled together and tape reels held in the assembled casings wherein the lower casing is provided with first reference holes at positions corresponding to reference pins formed in a magnetic tape cassette deck, to be fitted into the pins and second reference holes are formed in the upper casing so as to have the same center axis as that of the first reference holes, dimensions of all structural elements of the upper and lower casings being determined on the basis of both the reference holes.

1 Claim, 3 Drawing Figures

MAGNETIC TAPE CASSETTE CASING

The present invention relates to a magnetic tape cassette casing.

In many cases, interchangeability of a magnetic tape cassette with respect to a tape cassette deck is assured by measures of insertion of reference holes formed in the magnetic tape cassette into reference pins formed in the cassette deck. Further, for the interchangeability of the tape cassette with respect to the cassette deck, dimensions of various parts in the casing of the tape cassette are determined on the basis of the reference holes. In the conventional magnetic tape cassette, determination of the dimensions is made on the basis of the reference holes for a lower casing while dimensional relationships in an upper casing are determined on the basis of the end surface reference or the center line reference. Accordingly, any difference in reference surface, line or points between the upper and lower casings inevitably reduces accuracy in relative positions of the parts between the upper and lower casings due to accumulation of dimensional errors with the different reference surface, line and points.

It is an object of the present invention to provide a magnetic tape cassette casing having high accuracy.

The foregoing and the other objects of the present invention have been attained by providing a magnetic tape cassette casing comprising upper and lower casings to be assembled together and tape reels held in the assembled casing, characterized in that the lower casing is provided with first reference holes at positions corresponding to reference pins formed in a magnetic tape cassette deck, to be fitted into the pins and second reference holes are formed in the upper casing so as to have the same axis as that of the first reference holes, dimensions of all structural elements of the upper and lower casings being determined on the basis of both the reference holes.

A more complete appreciation of the invention and many of the attendant advantages thereof will be readily obtained as the same becomes better understood by reference to the following detailed description when considered in connection with the accompanying drawings, wherein.

An embodiment of the present invention will be described with reference to drawings.

Figure 1:
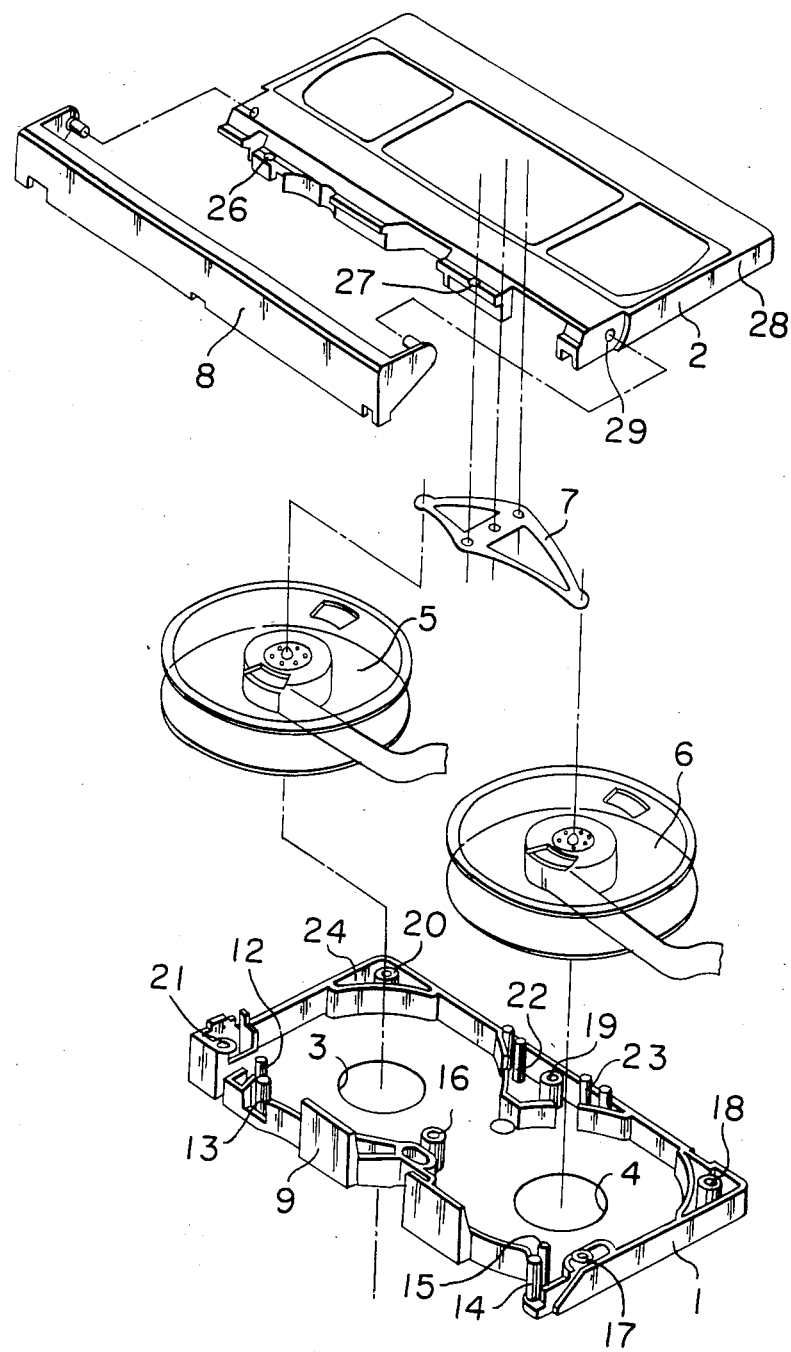
FIG. 1 is an exploded perspective view of an embodiment of the magnetic tape cassette of the present invention.

In FIG. 1 showing a video tape cassette in an exploded view, it is constituted by a lower casing 1, an upper casing 2 to be combined with the lower casing 1, tape reels 5, 6 each provided with a boss at its lower surface to be fitted into respective openings, 3, 4 formed in the lower casing 1, a leaf spring 7 fixed to the upper casing 2 to press down central projections formed in the upper surfaces of the tape reels 5, 6 and a protective cover 8 for a magnetic tape pivotally supported by the upper casing 2.

Figure 2:
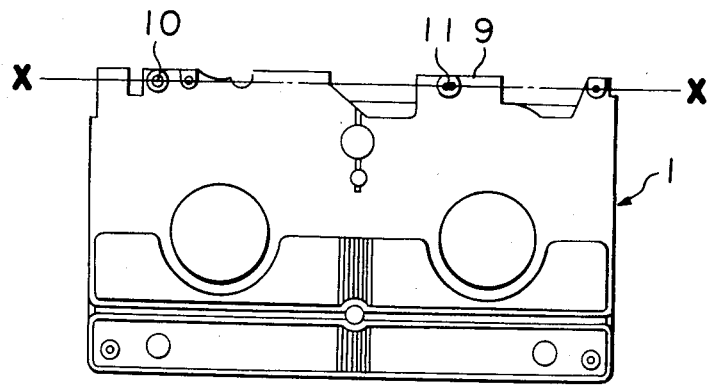
FIG. 2 is a bottom view of the lower casing of the magnetic tape cassette of the present invention.

In FIG. 2 showing the bottom surface of the lower casing 1, reference holes 10, 11 are formed in the bottom surface vertically with reference to the bottom surface at two points on the X axis apart and along the front surface 9 of the lower casing. With the arrangement of the reference holes, the magnetic tape cassette can be correctly mounted at a specified position on the tape deck by fitting these reference holes 10, 11 into corresponding reference pins of the tape deck. These reference holes 10, 11 are extremely significant from the standpoint of interchangeability allowing use of the tape cassettes irrespective of the kind of tape decks. The reference holes 10, 11 should be correctly related in position to the reference pins and accumulation of errors should be prevented by determining the dimensions of structural elements in the lower casing to ensure the interchangeability. Namely, determination of dimension with respect to the reference holes should be made for guide pins 12, 13, 14 and 15 in the lower casing 1, threaded holes 16, 17, 18, 19, 20 and 21 for set screws which are formed in the upper and lower casings, pivotal pins 22 and 23 for locking the reels and a rib 24 as shown in FIG. 1. The arrangement increases accuracy of the tape cassette.

Figure 3:
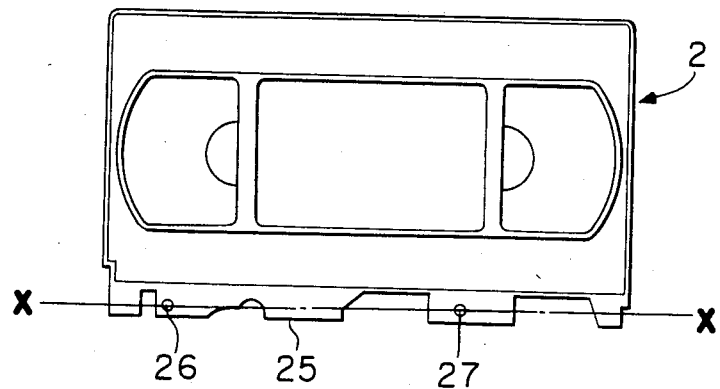
FIG. 3 is a plan view of the upper casing.

FIG. 3 shows the top surface of the upper casing 2 in which two reference holes 26, 27 are formed on the X axis apart and along the front surface 25 of the upper casing 2, the axis being common with the axis for the reference holes 10, 11 formed in the lower casing 1.

In the inner surface of the upper casing 2, there are formed recesses (not shown) to be fitted with the pins of the lower casing and internal thread holes (not shown) for the set screws which are inserted into the threaded holes 16 to 21 and at the periphery of the upper casing 2, there are formed a peripheral rib 28 and a pivotal hole 29 for the protective cover 8. The dimensions of the structural elements are determined on the basis of the reference holes 26, 27. The determination of dimensions of the elements corresponding to the lower casing is made in accordance with the same standard as the lower casing 1.

As described above, since the dimensions of the elements in the upper casing are determined with the same standard as the lower casing, good fitness of the upper and lower casings is provided whereby a magnetic tape cassette of high quality can be attained.

The reference holes 26, 27 of the upper casing are merely for the purpose of reference and it is unnecessary to be fitted into the reference pins of the tape deck. Accordingly the diameter of the holes can be small. Further, in case of the reference holes 26, 27 being through holes, determination of the dimension of the elements in the upper casing 2 can be performed from both sides. Since the through holes 26, 27 are concealed by the protectice cover 8 after assembling, there is no problem in appearance.

We claim:

1. A magnetic videotape cassette, comprising:

a lower casing having front and bottom surfaces;

an upper casing having a top surface, said upper and lower casings being joined to define boundaries of said cassette;

tape reels positioned in said cassette;

openings only in said lower casing corresponding to centers of said tape reels for introduction of tape reel drive means;

a front protective cover pivotally connected to said upper casing, said front cover being pivotable between a closed position wherein said front surface and a portion of said upper casing adjacent thereto are covered thereby, and an open position;

first reference holes in said bottom surface adjacent said front surface, said first reference holes being in alignment with reference pins of a cassette deck; and second reference holes in said upper casing and in coaxial alignment with first reference holes, said second reference holes being positioned on said covered portion of said upper casing wherein dimensions of all structural elements of said upper and lower casings are determined with reference to said first and second reference holes, and wherein said first reference holes are larger than said second reference holes.

* * * * *